Patented July 5, 1932

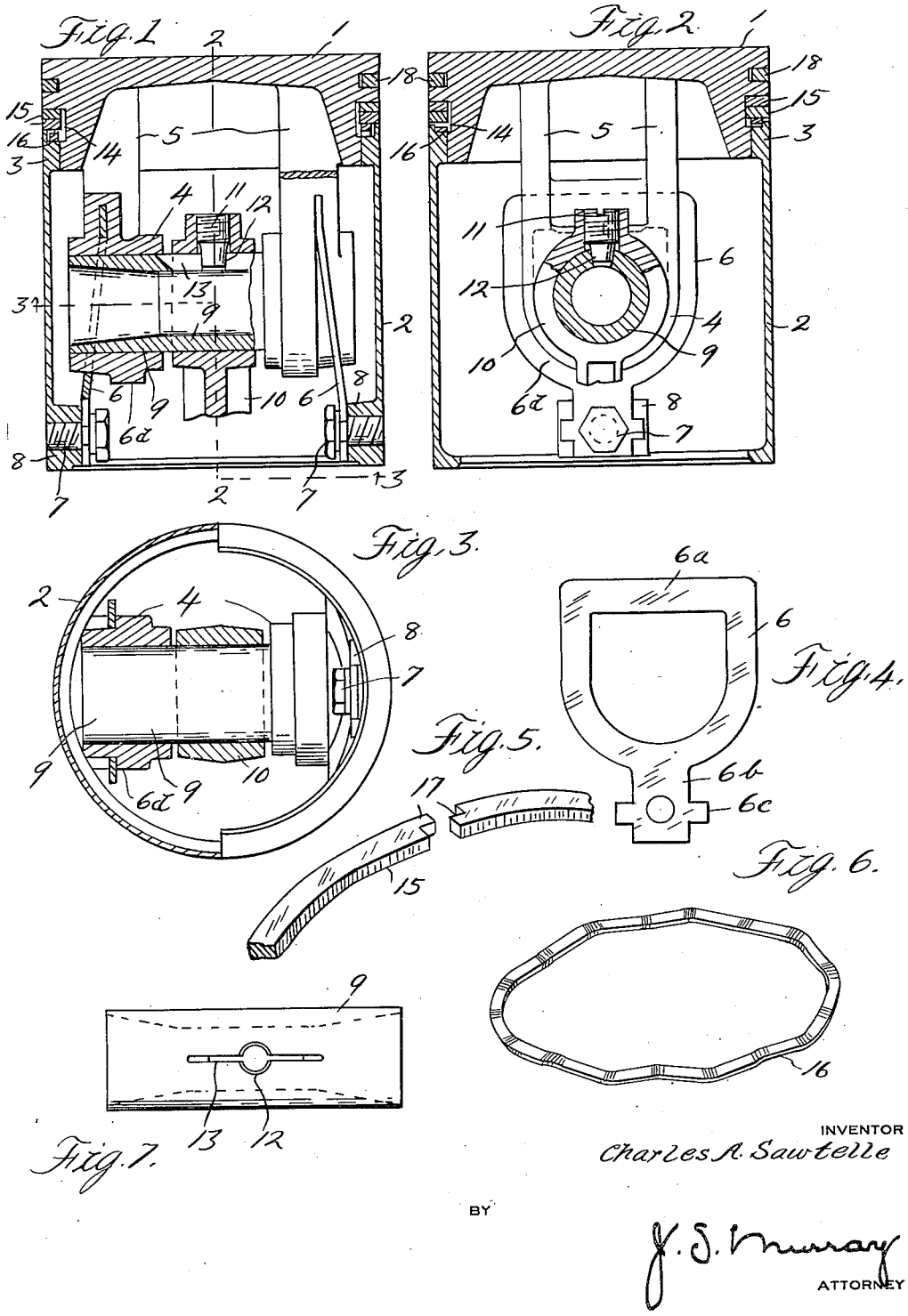

1,865,793

UNITED STATES PATENT OFFICE

CHARLES A. SAWTELLE, OF DETROIT, MICHIGAN, ASSIGNOR, BY DIRECT AND MESNE ASSIGNMENTS, TO S. AND D. ENGINEERING COMPANY, OF DETROIT, MICHIGAN, A CORPORATION OF MICHIGAN

PISTON

Application filed July 8, 1929. Serial No. 376,545.

This invention relates to pistons and particularly to internal combustion engine pistons of composite construction.

It is well recognized that aluminum and similar metals may be advantageously used for internal combustion engines because of their lightness, ease of machining, and rapid dissipation of heat. On the other hand, such a metal as aluminum is highly expansive under heat and consequently unsuited to form a piston skirt unless in some manner binding due to expansion is prevented. This has led to some development of pistons having aluminum heads and skirt portions of cast-iron or some metal having a like coefficient of expansion. The connections employed in such pistons between the heads and skirts thereof have not, however, properly provided for differential expansion of said parts and cracking, warping and other troubles have resulted.

Difficulty has further been experienced in the manufacture of pistons, composite and otherwise, in accurately aligning the wrist pin bearings and such inaccuracy has subjected the pistons to undue wear and reduced their sealing efficiency.

An object of the invention is to form the head and skirt of a piston of metals differing as to their coefficient of expansion and to so connect said parts as to fully provide for their differential expansion, without resultant binding, breakage, or distortion.

Another object is to form the skirt portion of a piston separately from the head and to adapt said skirt to undergo a slight lateral tilting relative to the head to compensate for inaccurate alignment of the wrist pin bearings.

A further object is to avoid necessity for wrist pin openings in a piston wall, whereby the bearing area of said wall is not reduced by the presence of such openings, and lubricating oil cannot escape into the piston through such openings.

A still further object is to adapt a piston to receive a sealing ring having a more extensive radial sealing surface than is permitted by present practice and to positively insure against an oil pumping action of said ring.

The establishment of a more effective overlapping seal between the ends of a split piston ring is also a feature of the invention.

These and various other objects the invention attains by the construction hereinafter described and illustrated in the accompanying drawing, wherein:

Fig. 1 is an axial sectional elevation of the improved piston, showing one of the wrist pin bearings and its connection to the piston skirt in side elevation.

Fig. 2 is an axial sectional elevation taken upon the line 2—2 of Fig. 1.

Fig. 3 is an end view of half the piston, showing the other half thereof in cross section, taken on line 3—3 of Fig. 1.

Fig. 4 is a detail view in side elevation of a flexible sheet metal member for connecting the head and skirt of the piston.

Fig. 5 is a perspective detail of the ends of a piston ring, showing how said ends are stepped for overlapping each other in a sealing relation.

Fig. 6 is a perspective view of a spring employed to subject said ring to a sealing pressure.

Fig. 7 is a top view of the wrist pin.

In these views, the reference characters 1 and 2 respectively designate the head and skirt of a piston, the former being of aluminum or other light metal characterized by a rapid dissipation of heat, and the latter being of cast-iron or other metal not expansive under heat to an appreciably greater extent than the cylinder in which said piston operates.

The upper end of said skirt embraces the lower end of said head with sufficient freedom to permit the former a slight lateral tilting relative to the latter. Preferably the skirt has at its upper end an internal annular rib 3, and the lower end of the head is reduced in diameter to engage within said annulus, the lateral faces of the head and skirt being substantially flush.

Wrist pin bearings 4 are formed by the lower ends of a pair of spaced projections 5 integrally carried by the head and extending into the skirt with suitable clearance therefrom. The skirt is secured to the head by flexibly connecting each of said bearings to the lower portion of the skirt. Thus a pair of resilient sheet metal stampings 6 have their upper ends cast into said bearings and are engaged at their lower ends by cap screws 7 tapped into a pair of bosses 8 oppositely formed upon the lower end of the skirt. These stampings are of approximately annular form, each comprising a strip 6a adapted to be cast into one of the bearings 4 above the opening thereof and side portions downwardly extending from the ends of said strip straddling the bearing and free to flex relative to the strip 6a. From the juncture of said side portions, there projects downwardly a tongue 6b formed with a pair of oppositely projecting lugs 6c. The bearings 4 are preferably formed with ribs 6d upon their sides and bottoms against which the members 6 freely bear, said ribs being adapted to limit inward flexing of the members 6. The bosses 8 are formed with shallow intersecting vertical and horizontal channels to respectively receive the tongue 6b and lugs 6c. Thus any shearing strain on the screws 7 is avoided and turning of the skirt about the axis of the screws 7 is positively prevented. The members 6, as illustrated, incline slightly away from the piston axis as they extend downwardly, since the bearings 4 are more closely adjacent to said axis than the rib 8.

The wrist pin 9 journaled in the bearings 4 is preferably tubular and is rigidly engaged by a connecting rod 10 fitted between and restrained by said bearings from play in the direction of the wrist pin axis. As a preferred means for rigidly connecting the wrist pin and connecting rod, the latter is radially bored and tapped to receive a screw 11 having a conically tapered inner end engaging in a correspondingly tapered socket 12 in the wrist pin. From said socket slits 13 extends sufficiently toward the ends of the wrist pin to provide for a slight expansion of its mid portion. Thus when the screw 11 is driven in, its tapered end so expands the socket 12 and slits 13 as to bind the pin tightly in the connecting rod opening.

It is preferred to form the head 1 with a piston ring groove 14 just above the skirt 2, so that the top edge of said skirt forms the bottom wall of said groove. In said groove are set one or more piston rings 15 having a depth or radial dimension considerably greater than is standard practice. The depth of standard piston rings is limited by necessity of affording them a resiliency adequate to permit their being expanded over the piston head into registration with the ring grooves. The present construction allows the rings 15 to be put in place prior to assembling the head and skirt of the piston and hence permits them to have any desired degree of stiffness. The advantage derived from rings of large depth lies in their presentation of large lateral surface areas for contact with the groove walls.

To insure a firm sealing contact of the rings with the top wall of the groove 14 and with each other, it is preferred to dispose in said groove a ring 16 of spring sheet metal radially corrugated for compression between said rings and the top of the skirt.

The rings 15 furthermore differ from ordinary piston rings in that their ends are formed with tongues 17, each having the full axial dimension of the ring, said tongues lying side by side instead of one above another as in present practice. When the ring ends are so formed and two of such rings are placed in one groove with their joints diametrically opposed, no opportunity is afforded for gas to escape either radially through the rings or downwardly between their overlapped ends. It will be noted that the skirt extends slightly above the rib 3, so as to enclose the spring 16 and prevent any scoring of the cylinder wall by said ring in the event of its breaking.

One or more rings 18 of an ordinary type may be additionally provided adjacent to the top face of the head.

It is an important feature of the described piston that its parts may expand differentially both radially and longitudinally without giving rise to undue stresses.

Also, a lack of accurate alignment between the wrist pin bearings will not detrimentally affect the operation of said piston since the skirt may adjust itself out of axial alignment with the head to compensate for any such inaccuracy.

No loss of sealing efficiency results from slight variations in the width of the groove 14 due to differential expansion of the head and skirt since such variations will be compensated for by expansion and contraction of the spring ring 16.

What I claim is:

1. A piston comprising a head and a separately formed skirt having end portions fitting freely, one within the other, said head comprising a pair of spaced wrist pin bearings projecting into said skirt, and means individually resiliently connecting each of said bearings to the skirt.

2. A piston comprising a head and a separately formed skirt having end portions fitting freely, one within the other, said head having a pair of spaced wrist pin bearings projecting into said skirt, and a pair of resilient members cast into said bearings and forming extensions therefrom toward the free end of the skirt, and means securing the skirt at its free end to said extensions.

3. A piston comprising a head and a separately formed skirt having end portions fitting freely one within the other, said head having a pair of spaced wrist pin bearings projecting into said skirt, a pair of resilient members of substantially annular form to surround the wrist pin openings, and having corresponding ends cast into said bearings, and means securing the other ends of said members to the skirt.

4. A piston comprising a head and a separately formed skirt, said head comprising a pair of wrist-pin bearings projecting into said skirt, and a pair of members each connecting one of said bearings to the lower portion of said skirt, and flexible in a direction substantially diametrical to the piston.

5. A piston comprising a head and a separately formed skirt, said head comprising a pair of wrist-pin bearings projecting into said skirt, and a pair of members individually connecting said bearings to said skirt, each of said members having a portion above the corresponding bearing opening rigidly engaging the bearing, and having portions extending free of and at each side of the bearing.

6. A piston comprising a head and a separately formed skirt, freely engaging said head, and a connection between said head and the end of the skirt remote from the head, substantially unyielding lengthwise of the piston and flexible radially to the piston.

7. A piston comprising a head and a separately formed skirt, having portions freely fitting one within another, and a pair of connections between the head and the end of the skirt remote from the head, said connections being substantially unyielding lengthwise of the piston and being flexible to and from each other to afford the head and skirt a limited disalignment.

8. A piston comprising a head, a separately formed skirt, a wrist pin carried by said head within and diametrically to said skirt, and means connecting the head and skirt flexible in a direction parallel to said wrist pin, and substantially unyielding in all other directions.

9. A piston comprising a skirt, a separately formed head having a pair of spaced wrist pin bearings projecting into said skirt, a wrist pin carried by said bearings, and a pair of connections between said bearings and skirt, flexible in substantial parallelism with the wrist pin axis and substantially unyielding in all other directions.

10. In a piston as set forth by claim 9, means upon said bearings limiting inward flexing of said connections.

11. A piston comprising a head and a separately formed skirt, a wrist pin carried by the head within the skirt, and a plurality of sheet metal members connecting said head and skirt, each substantially transverse to the wrist pin axis, the connections of each of said members to the head and skirt being set apart longitudinally of the piston and said members being flexible between said connections to afford the skirt and head a limited disalignment.

In testimony whereof I sign this specification.

CHARLES A. SAWTELLE.